May 5, 1970   R. M. LAMB   3,510,174
ENDLESS TRACK VEHICLE
Filed Jan. 24, 1968   3 Sheets-Sheet 1
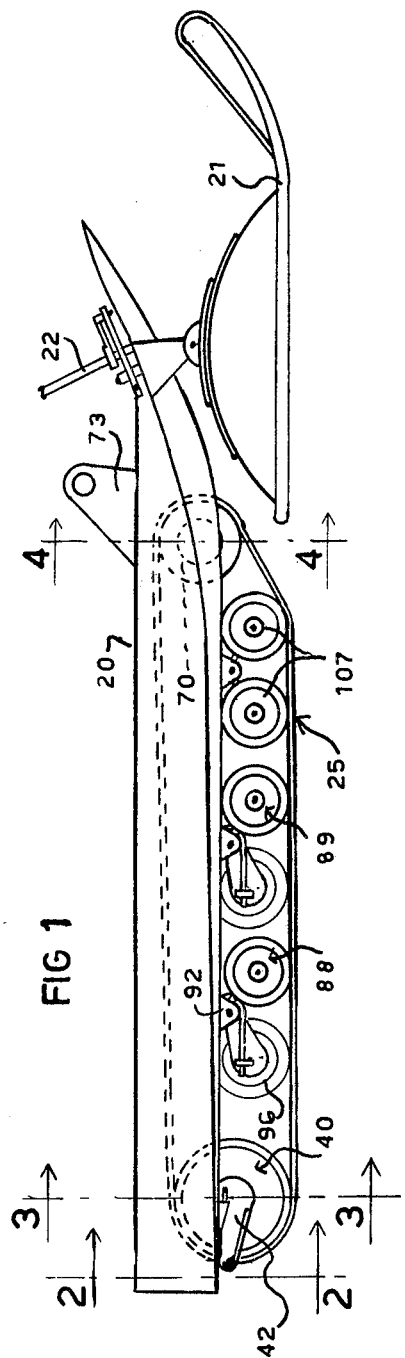
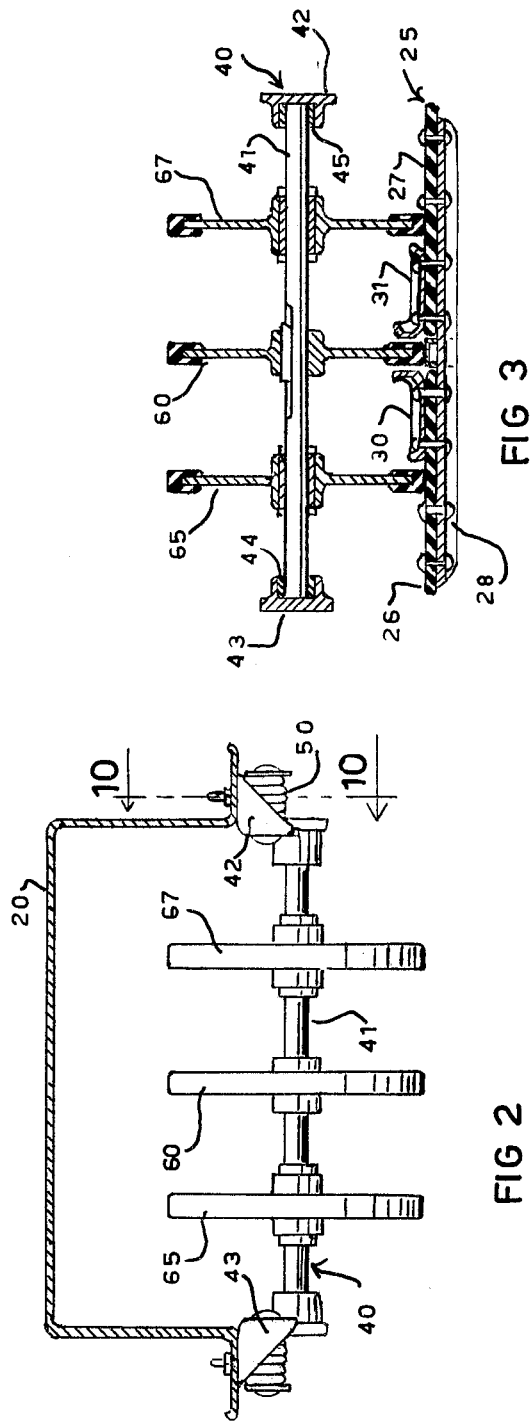
INVENTOR.
ROBERT M. LAMB
BY
J.A. Seegrist

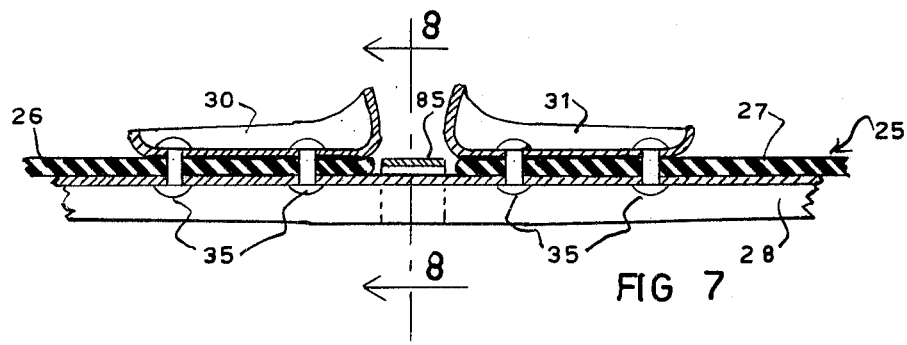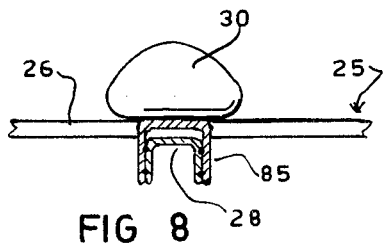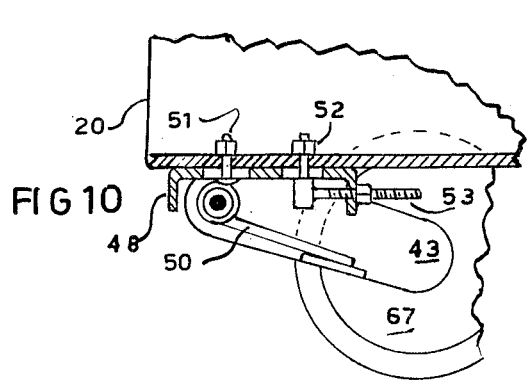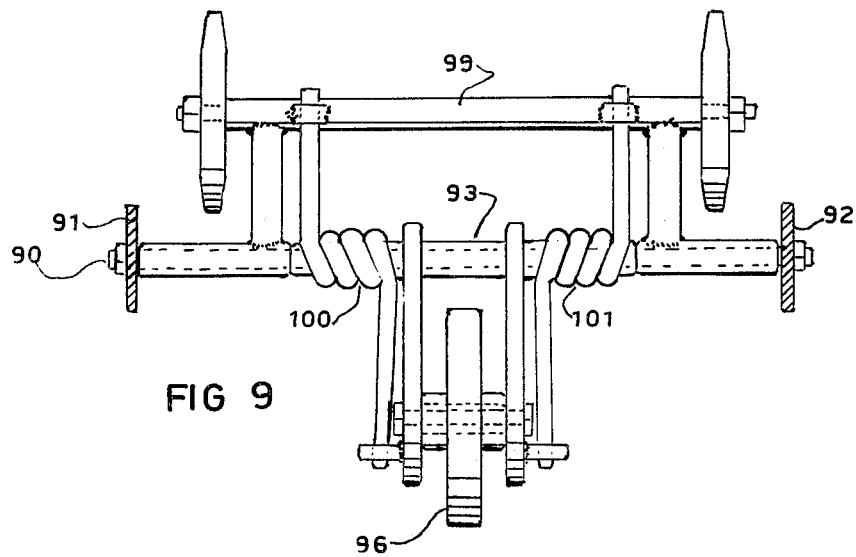

United States Patent Office 3,510,174
Patented May 5, 1970

3,510,174
ENDLESS TRACK VEHICLE
Robert M. Lamb, 915 Oswego St.,
Liverpool, N.Y. 13088
Filed Jan. 24, 1968, Ser. No. 700,069
Int. Cl. B62d *55/16;* B62m *27/00*
U.S. Cl. 305—27                             9 Claims

ABSTRACT OF THE DISCLOSURE

A snowmobile in which a resilient material, endless track is provided with two adjacent centrally positioned rows of wear resistant guide plates. The rear idler assembly has a central track guide wheel running between the plates without contacting the track material to avoid wear and tear. A track tension support wheel is provided on each side of the plates. The idler assembly is of large diameter to aid in self cleaning. The bogie wheel assemblies have similar track guide wheels.

---

This invention relates to an endless track vehicle or snowmobile, a vehicle in which a single, motor driven, flexible resilient belt forming an endless track, supports most of the vehicle weight, the vehicle being steered with flexibly mounted runners positioned on the vehicle front and supporting the balance of its weight. Insofar as the present invention is concerned the steering system may be of any design, but preferably it is that shown in my copending application Ser. No. 700,070, filed Jan. 24, 1968, entitled "Turnable Runner Steered Vehicle."

A nagging problem in vehicles of this kind arises from the fact that when the vehicle is turned in steering the track tends to follow its own forward course and is forced to turn with a side skidding motion. Thus the rear portion of the track must be forced over to one side or the other on the terrain depending on the direction of the turn. In a usual type vehicle the track is held, or guided, in alignment with the vehicle by permitting its edges to ride against the rear idler supporting arms. This is destructive of the belt, especially in case of the longer chassis vehicles.

It is an object of the present invention to provide a track alignment guide system which prevents the resilient material of the belt from slideably contacting any portions of the vehicle, and yet maintains the track substantially in perfect alignment with the chassis under all steering conditions.

Another problem encountered in using an iced terrain vehicle involves the collecting of ice and snow on the inside of the looped track belt, especially in conditions of wet snow. The snow entering at the sides and through the driving sprocket teeth apertures may hang in the belt even to the extent of being carried along with the upper return portion of the looped belt all the way to the drive sprocket. It may tumble within the track and collect in a quantity sufficient to stall the vehicle. It is then necessary to laboriously hand remove the packed ice-like snow before the track will again rotate.

It is a further object of the present invention to design a track and its associated parts which keep clear of packed snow automatically and efficiently.

In the drawing, FIG. 1 is a side elevation of the snowmobile minus the motor, caul, steering wheel and seat, the endless track being shown schematically;

FIG. 2 is an enlarged section on line 2—2 of FIG. 1;

FIG. 3 is an enlarged section on line 3—3 of FIG. 1, the side arm connections of the idler assembly to the frame being omitted;

FIG. 7 is a section on the line 7—7 of FIG. 6;

FIG. 8 is a section on the line 8—8 of FIG. 7;

FIG. 9 is a view looking downward on one set of a combined bogie and alignment sheel assembly on the scale of FIG. 4; and FIG. 10 is a section on line 10—10 of FIG. 2.

Figure 4:
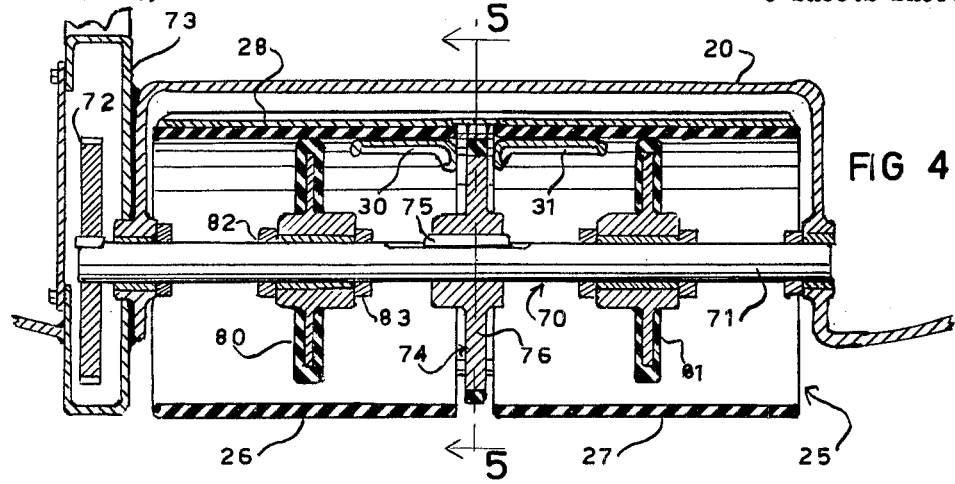
FIG. 4 is a section on line 4—4 of FIG. 1 enlarged more than FIG. 2, and is the same as a section on line 4—4 of FIG. 5.
Figure 5:
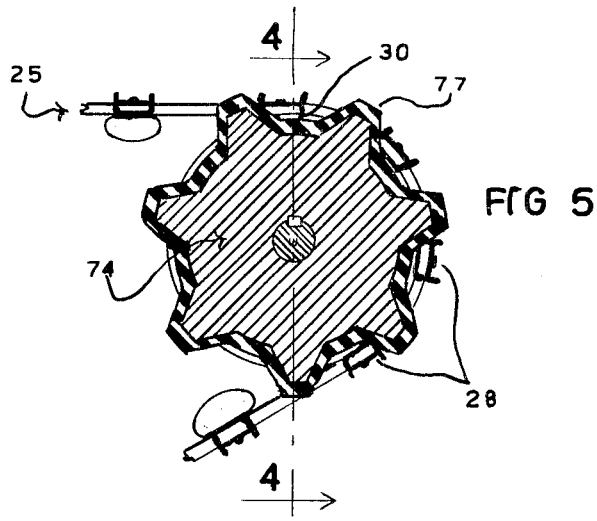
FIG. 5 is a section on line 5—5 of FIG. 4.
Figure 6:
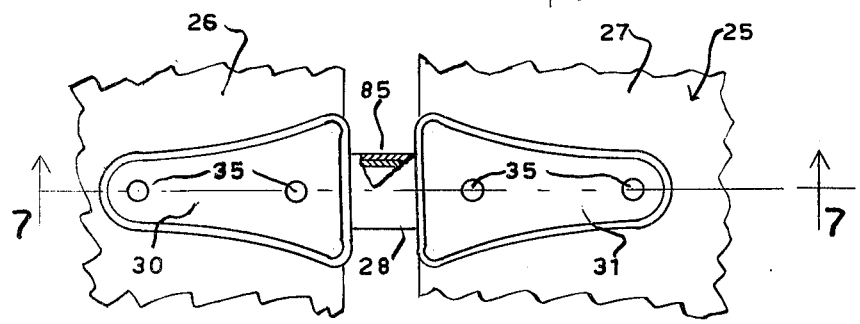
FIG. 6 is an enlarged plan view with parts broken away looking towards a portion of the inside of the track.

The snowmobile is provided with an integral body and frame 20, which may be equipped with usual type steering runners, one of which is shown at 21, and a steering column 22.

An endless resilient belt type track, shown generally at 25, is provided with two reinforced resilient material ribbons 26 and 27 held spaced apart side by side with cleats 28 fastened to the ribbons. The cleats are equally spaced longitudinally at an appropriate distance apart that they function as drive cleats in cooperation with the later described drive sprocket. The cleats are also located on the outer periphery of the track to engage the terrain and function as track cleats.

Two rows of centrally positioned guide plates are fixed to the track on its inner peripheral surface. Each guide plate includes an attaching portion positioned on the inner surface of the track and an alignment portion extending inwardly from the inner surface. The rows extend longitudinally of the track and are laterally spaced apart so that laterally adjacent alignment portions of the plates are positioned such that each adjacent face of an alignment portion is slightly inward of the inner edge of the track ribbon to which the plate is attached. Two such guide plates, characterized 30 and 31, to be described in detail, are secured immediately opposite their matching track cleat by fasteners, such as rivets 35, extending through the attaching portions of the plates, the material of the track ribbons and the cleats, thus to produce a securement permitting translation of forces directly from the plates to the cleats.

The plates have their adjacent faces convexed as illustrated for reasons later described.

At its back end, the vehicle is provided with an idler or belt driven assembly generally shown at 40 over which the track is belted. The idler assembly is provided with a shaft 41 rotatably supported at its ends on side arms 42 and 43. The rear bearings supporting the transversely mounted shaft are shown as bearing sleeves 44 and 45 (as are all other bearings depicted in the drawing), it being understood that longer wearing bearings, such as sealed ball or roller sets, may be used.

The side arm 42 and 43 and their supports are similar and only one will be described. One end of the arm 43 opposite the mounting of the shaft 41, is swivelly mounted on a bracket 48, the shaft end of the side arm being biased downwardly by a coil spring 50 for vehicle spring suspension purposes. Bracket 48 is mounted for rearward adjustment on the frame by means of clamping bolts 51 and 52 and an adjusting bolt and nut 53, the whole idler assembly and side arm assembly being rearwardly movable to tighten the track.

A track alignment guide wheel 60 is secured to the shaft 40 against lateral movement of the guide wheel by means of a key 61. The wheel is positioned such that its periphery mates between the rows of centrally positioned track alignment guide plates closely spaced from the inwardly extending alignment guide portions of the plates. Wheel 60 is preferably formed with a metallic body 62 and rubber tire 63, the tire portion engaging the alignment guide plates. Any side movements of the track is transferred through the track alignment guide plates directly to the tired sides of the track alignment guide wheel and through the shaft 41 to the side arms and frame. Thus the only forces which guide the track in its longitudinal alignment with the frame are directed through the track alignment guide plates, fasteners 35 and cleats 28 to the belt in such a way all resultant wear and tear on the belt is eliminated.

The rear idler assembly is also provided with two track tension-bearing wheels 65 and 67 spaced on each side of wheel 60 over which ribbons 26 and 27 are belted. Wheels 65 and 67 are preferably rotatably mounted on the shaft 41 with suitable bearings and held against lateral movement with collars fixed to the shaft in a usual manner, such as by set screws in the collars engaging the shaft. The attaching portions of the guide plates extend laterally outwardly from the sides of the alignment portions and terminate spaced from the tension-bearing wheels.

The guide plates are longitudinally spaced sufficiently far apart to prevent their contacting each other as the track loops around the idler assembly and drive sprocket during its rotation. However, they are sufficiently close together to assure that at least two of the laterally adjacent alignment portions of the plates will always be in mating position with the alignment guide wheel.

The convexed surfaces of the alignment portions of the plates adjacent the alignment guide wheel act to guide the plates properly into their mating position with the periphery of the guide wheel.

A front track sprocket drive assembly generally shown at 70 is provided with a drive shaft 71 rotatably supported with suitable bearings at its ends on the frame 20. At one end shaft 71 has a chain driven sprocket 72, non-rotatably attached to it to be driven by a chain (not shown) connecting it to the power plant in a usual manner, the driven sprocket 72 and associated parts being housed in case 73.

A track drive sprocket wheel 74 is non-rotatably secured to shaft 71 by a key 75. The drive sprocket is designed with a high strength metallic inner body portion 76 and integral metallic teeth, the teeth being covered with a shock resistant long wearing rubber material 77.

Belt, or track, tension bearing wheels 80 and 81 are rotatably mounted on shaft 71 in axial alignment with the track drive sprocket wheel and bear on the inside of the track ribbons 26 and 27. Wheels 80 and 81 are held against axial displacement with side collars, such as 82 and 83, fixed to the shaft in the usual manner.

The teeth of sprocket wheel 74 project through the apertures formed between the track ribbons 26 and 27 and between adjacent track cleats and engage against the cleats 28 to drive the track. The cleats are each provided with a U-shaped wear plate 85 welded to the cleat and projected inwardly between the ribbons such that its cross portion is essentially flush with the inner peripheral surface of the track. This gives a wide bearing engagement of the sprocket teeth against the wear plate to increase the wear life of the sprocket teeth covering, and to diminish the bending torque on the teeth tending to break them at the roots. Plates 85 also are the bearing plates on which the peripheries of the track alignment wheel 60, and of other alignment wheels, ride.

The belt tension bearing wheels 80 and 81 are of a slightly larger diameter than that of the drive sprocket wheel 74 at the root of the teeth. This construction places all the force arising from the belt tension on wheels 80 and 81.

Due to the fact that the drive cleats are fastened directly to the resilient material of the belt, the spacing of the drive cleats is not exact. The belt material, even if well reinforced, is subject to some stretch and recovery during use, the amount of stretch varying with the driving load placed on the belt. Also the belt gains a permanent degree of stretch as it ages.

The result is that the sprocket teeth do not uniformly engage the drive cleats, and the drive cleats have a slight movement between the teeth. If the cleats are allowed to ride hard in the valleys between the teeth, the shock resistant material covering the sprocket between the teeth is subjected to high pressure and rubbing by the cleats. Loss of power and destruction of the material results.

According to the present construction no belt tension forces are imparted to the sprocket. There is no contact of the driving cleats with the shock resistant material between the teeth. The wear life of the sprocket and its power transferring efficiency are enhanced.

Although the guide plates perform their principal function in cooperation with the alignment guide wheels to hold the track in alignment with the vehicle frame, they also perform in guiding the belt on the belt drive sprocket assembly. To this end the guide plates are positioned so that their convex adjacent faces lie slightly inward of the belt ribbon edges. Due to this feature and to the fact that the guide plates are fastened opposite the drive cleats, they always mate with the drive sprocket teeth to keep the belt in perfect alignment on the drive sprocket assembly, without the teeth contacting the edges of the ribbons.

The construction of the sprocket with the high strength, metallic teeth taking the driving load makes possible the use of a minimum distance between the belt ribbons, and resulting minimum size of sprocket teeth holes through the belt. Thus a minimum amount of snow or debris is permitted ingress through the holes to make trouble. With a total track width of 18 inches, for example, a sprocket tooth spacing of one inch is ample for a sprocket having four teeth for driving engagement with the drive cleats.

The area of maximum tendency of the track to move laterally of the frame during steering involves the rear portion of the track. This portion of the track supports the larger part of the vehicle's weight and is in greater pressure with the terrain. Providing the track alignment guide wheel at the rear idler assembly is therefore the most significant and may be sufficient in case the snowmobile is small or has a short track. However, with the longer track vehicles side movement of the track tends to occur all the way towards the front, being noticeable for at least three-fourths the track length, and additional track alignment guide wheels, located forwardly of the rear idler assembly in an intermediate track position, are desirable.

Two such intermediate alignment guide wheel assemblies 88 and 89 are disclosed in the present snowmobile. They are similar and only assembly 88 shown in detail in FIG. 9 will be described.

The assembly is supported on a main shaft 90 secured to ears 91 and 92 welded to frame 20. A sleeve 93 is swiveled on shaft 90 and has two side arms 94 and 95 welded to it. The alignment guide wheel 96, similar in structure to wheel 60, is rotatably mounted on a shaft at the ends of the side arms 94 and 95 to run between the rows of alignment guide plates.

A pair of bogie wheels 97 and 98 are carried on a bracket member 99 also swivally mounted on the shaft 90. The bogie wheels and the alignment guide wheel are all biased by coil springs 105 and 106 against the track to allow vertical motion of the wheels.

A third set of bogie wheels 107 is of conventional design.

A major problem encountered with snowmobiles of the single track type, relates to the collecting and compacting of unwanted snow in the inside of the track, often sufficient to stall the vehicle. In case the packed snow is wet and becomes frozen it is extremely laborious to remove.

I have found that the track arrangement shown is very effective in keeping the snow from clogging the belt. Although I cannot explain precisely why, I believe it is due primarily to having the rear idler assembly sufficiently large that snow has room to fall away from the upper return portion of the track and be expelled at the sides without being returned around the rear idler assembly. Also, enlarging the idler assembly results in decreasing its angular velocity for any given velocity of the track, thus decreasing the centrifugal force of the snow mass inside the track as the snow is swung around the rear idler assembly. The force tending to pack the snow against the inside of the track is accordingly diminished and it more readily loosens itself from the upper return portion. The entrapped snow tumbles around and drops out at the sides of the track without being carried forward very far.

To accomplish the desired end, the idler assembly has a diameter at least one-half that of the track width. In the snowmobile shown, the idler wheel assembly has a 9½-inch diameter and the track width is 18 inches. The drive sprocket has a diameter of 6½ inches. It is geared to drive the vehicle at an approximate crusing speed of 25 miles per hour and a maximum speed of 40 miles per hour. The corresponding angular velocities of the idler assembly are in the order of 875 r.p.m., cruising, and 1400 r.p.m., maximum, a maximum of about 1500 r.p.m. corresponding to a permissible smaller idler assembly.

Also snow, especially when wet, that clings to the inside surface of the belt is broken up by the alignment plates. As these plates pass around the idler wheel assembly their ends remote from the belt flex towards and then away from each other, thus exerting a breaking up action on snow encrusted or frozen around them. This aids in causing the snow inside the track to break away.

Also the guide plates and the track alignment guide wheels in their central location tend to partition the track into equal side compartments, further aiding in expelling the snow out at the sides.

Also snow entering the track through the space between the track ribbons and lodged between the guide plates is expelled by the smooth periphery of the track alignment guide wheels as they bear against the track cleats.

I claim:

1. A vehicle comprising: a frame; a single endless track rotatably mounted on the frame, said track having two side by side, spaced apart resilient material ribbons, track cleats on the outer periphery of the track fastened across the ribbons holding them together, a row of spaced guide plates on each ribbon, each guide plate being positioned opposite a track cleat and extending inwardly from the inner surface of the track adjacent the space between the ribbons, and fasteners extending through the material of the ribbons and through the track cleats fixing the guide plates to the track; a rear idler wheel assembly, said assembly having a shaft mounted transversely on the vehicle frame, an alignment guide wheel on the shaft immovable laterally thereof and running between the rows of alignment guide plates to maintain the track in alignment with the frame as the track rotates and the vehicle is subjected to steering, and a track tension-bearing wheel spaced on each side of the alignment guide wheel coaxial therewith over which the track is belted with each track tension-bearing wheel engaging one of the ribbons; the guide plates being longitudinally spaced apart sufficiently to prevent their contacting each other as the track loops during its rotation but being spaced sufficiently close together to assure that at least two laterally adjacent plates are always in mating position with the alignment guide wheel; and another alignment guide wheel located forwardly of the rear idler wheel assembly and running between the rows of alignment guide plates, said forwardly located alignment guide wheel being laterally immovably mounted on the frame but spring mounted to allow vertical motion.

2. The vehicle of claim 1 in which the diameter of the idler wheel assembly is at least one-half the width of the track.

3. The vehicle of claim 1 in which the diameter of the rear idler wheel assembly is at least one-half the width of the track and is at least 9 inches.

4. The vehicle of claim 1 in which the diameter of the rear idler wheel assembly is at least one-half the width of the track and is at least 9 inches, said vehicle having a front powered sprocket drivingly engaging the track cleats between the ribbons in which the ratio of the diameter of the rear idler wheel assembly to that of the drive sprocket is at least 19 to 13.

5. A vehicle comprising: a frame; a single resilient material, endless track rotatably mounted on the frame, track cleats on the outer periphery of the track, two rows of laterally spaced guide plates centrally positioned on the track, each guide plate being positioned opposite a track cleat and extending inwardly from the inner surface of the track, and fasteners extending through the material of the track and through the track cleats fixing the guide plates to the track; a rear idler wheel assembly, said assembly having a shaft mounted transversely on the vehicle frame, an alignment guide wheel on the shaft immovable laterally thereof and running between the rows of alignment guide plates to maintain the track in alignment with the frame as the track rotates and the vehicle is subjected to steering, and a track tension-bearing wheel spaced on each side of the alignment guide wheel coaxial therewith over which the track is belted; the guide plates being longitudinally spaced apart sufficiently to prevent their contacting each other as the track loops during its rotation but being spaced sufficiently close together to assure that at least two laterally adjacent plates are always in mating position with the alignment guide wheel; and another alignment guide wheel located forwardly of the rear idler wheel assembly and running between the rows of alignment guide plates, said forwardly located alignment guide wheel being laterally immovably mounted on the frame but spring mounted to allow vertical motion.

6. A vehicle comprising: a frame; a single endless track rotatably mounted on the frame, said track having two side by side, spaced apart resilient material ribbons, track cleats on the outer periphery of the track fastened across the ribbons holding them together, a row of spaced guide plates on each ribbon, each guide plate including an attaching portion positioned on the inner surface of the track opposite a track cleat and an alignment portion extending inwardly from the inner surface of the track adjacent the space between the ribbons, and fasteners extending through the material of the ribbons and through the track cleats and through the attaching portions fixing the guide plates to the track; and a rear idler wheel assembly, said assembly having a shaft mounted transversely on the vehicle frame, an alignment guide wheel on the shaft immovable laterally thereof and running between the rows of alignment guide plates with the sides of the alignment guide wheel closely spaced from the inwardly extending portions of the plates to maintain the track in alignment with the frame as the track rotates and the vehicle is subjected to steering, and a track tension-bearing wheel spaced on each side of the alignment guide wheel coaxial therewith over which the track is belted with each track tension-bearing wheel engaging one of the ribbons; each attaching portion of the guide plates extending laterally outwardly from the side of the alignment portion and terminating spaced from said tension-bearing wheel; the guide plates being longitudinally spaced apart sufficiently to prevent their contacting each other as the track loops during its rotation but being spaced sufficiently close together to assure that at least two laterally adjacent plates are always in mating position with the alignment guide wheel.

7. A vehicle comprising: a frame; a single endless track rotatably mounted on the frame, said track having two side by side, spaced apart resilient material ribbons, track cleats on the outer periphery of the track fastened across the ribbons holding them together, a row of spaced guide plates on each ribbon, each guide plate including an attaching portion positioned on the inner surface of the track opposite a track cleat and an alignment portion extending inwardly from the inner surface of the track adjacent the space between the ribbons, and fasteners extending through the material of the ribbons and through the track cleats and through the attaching portions fixing the guide plates to the track; and a rear idler wheel assembly, said assembly having a shaft mounted transversely on the vehicle frame, an alignment guide wheel on the shaft immovable laterally thereof and running between the rows of alignment guide plates with the sides of the alignment guide wheel closely spaced from the inwardly extending portions of the plates to maintain the track in alignment with the frame as the track rotates and the vehicle is subjected to steering, and a track tension-bearing wheel spaced on each side of the alignment guide wheel coaxial therewith over which the track is belted with each track tension-bearing wheel engaging one of the ribbons; each attaching portion of the guide plates extending laterally outwardly from the side of the alignment portion and terminating spaced from said tension-bearing wheel; the guide plates being longitudinally spaced apart sufficiently to prevent their contacting each other as the track loops during its rotation but being spaced sufficiently close together to assure that at least two laterally adjacent plates are always in mating position with the alignment guide wheel, said vehicle having a front powered sprocket drivingly engaging the track cleats between the ribbons in which the ratio of the diameter of the rear idler wheel assembly to that of the drive sprocket is at least 19 to 13.

8. A vehicle comprising: a frame; a single resilient material, endless track rotatably mounted on the frame, track cleats on the outer periphery of the track, two rows of laterally spaced guide plates centrally positioned on the track, each guide plate including an attaching portion positioned on the inner surface of the track opposite a track cleat and an alignment portion extending inwardly from the inner surface of the track, and fasteners extending through the material of the track and through the track cleats and through the attaching portions fixing the guide plates to the track; and a rear idler wheel assembly, said assembly having a shaft mounted transversely on the vehicle frame, an alignment guide wheel on the shaft immovable laterally thereof and running between the rows of alignment guide plates with the sides of the alignment guide wheel closely spaced from the inwardly extending portions of the plates to maintain the track in alignment with the frame as the track rotates and the vehicle is subjected to steering, and a track tension-bearing wheel spaced on each side of the alignment guide wheel coaxial therewith over which the track is belted; each attaching portion of the guide plates extending laterally outwardly from the side of the alignment portion and terminating spaced from said tension-bearing wheel; the guide plates being longitudinally spaced apart sufficiently to prevent their contacting each other as the track loops during its rotation but being spaced sufficiently close together to assure that at least two laterally adjacent plates are always in mating position with the alignment guide wheel; said track having apertures therethrough between adjacent track cleats and said vehicle having a front powered sprocket with teeth drivingly engaging the track cleats through said apertures.

9. A vehicle comprising: a frame; and a single resilient material endless track rotatably mounted on the frame, said track having track cleats on the outer periphery of the track, two rows of laterally spaced guide plates centrally positioned on the track, each guide plate including an attaching portion positioned on the inner surface of the track opposite a track cleat and an alignment portion extending inwardly from the inner surface of the track, and fasteners extending through the material of the track and through the track cleats and through the attaching portions fixing the guide plates to the track; said vehicle having an alignment guide mounted immovable laterally of the frame and running between the rows of alignment guide plates with the sides of the alignment guide closely spaced from the inwardly extending portions of the plates to maintain the track in alignment with the frame as the track rotates and the vehicle is subjected to steering, and a track tension-bearing wheel spaced on each side of the alignment guide over which the track is belted; each attaching portion of the plates extending laterally outwardly from the side of the alignment portion and terminating spaced from said tension-bearing wheel; the guide plates being longitudinally spaced apart sufficiently to prevent their contacting each other as the track loops during its rotation but being spaced sufficiently close together to assure that at least two laterally adjacent plates are always in mating position with the alignment guide; said track having apertures therethrough between adjacent cleats and said vehicle having a front powered sprocket with teeth drivingly engaging the track cleats through said apertures.

References Cited

UNITED STATES PATENTS

| | | | |
|---|---|---|---|
| 2,515,128 | 7/1950 | Lammertse | 305—38 |
| 3,019,061 | 1/1962 | Schomers | 305—56 X |
| 3,165,364 | 1/1965 | Hardman | 305—13 |
| 3,205,023 | 9/1965 | Nodwell | 305—38 |
| 3,282,630 | 11/1966 | Harrison | 305—38 |
| 3,309,150 | 3/1967 | Marier | 305—27 |
| 3,362,492 | 1/1968 | Hansen | 305—35 X |
| 3,404,745 | 10/1968 | Smieja | |

FOREIGN PATENTS

| | | |
|---|---|---|
| 1,060,181 | 11/1953 | France. |
| 683,957 | 4/1964 | Canada. |
| 35,727 | 1/1954 | Poland. |

RICHARD J. JOHNSON, Primary Examiner

U.S. Cl. X.R.

180—5; 305—35, 56